(12) United States Patent
Zhang et al.

(10) Patent No.: US 11,914,225 B2
(45) Date of Patent: Feb. 27, 2024

(54) HINGE FEED ANTENNA OF EYEWEAR

(71) Applicant: Meta Platforms, Inc.

(72) Inventors: Ce Zhang, Redmond, WA (US); Bruno Cendon Martin, Palo Alto, CA (US); Jennifer Davis-Wilson, Mountain View, CA (US); Geng Ye, San Jose, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 29 days.

(21) Appl. No.: 17/720,396

(22) Filed: Apr. 14, 2022

(65) Prior Publication Data

US 2022/0236592 A1 Jul. 28, 2022

Related U.S. Application Data

(63) Continuation of application No. 16/684,505, filed on Nov. 14, 2019, now Pat. No. 11,333,905.

(51) Int. Cl.
| | | |
|---|---|---|
| G02C 11/00 | (2006.01) | |
| B29D 12/02 | (2006.01) | |
| G02B 27/01 | (2006.01) | |
| G02C 5/14 | (2006.01) | |
| G02C 5/22 | (2006.01) | |
| G06F 1/16 | (2006.01) | |
| H01Q 9/30 | (2006.01) | |

(Continued)

(52) U.S. Cl.
CPC .............. *G02C 11/10* (2013.01); *B29D 12/02* (2013.01); *G02B 27/017* (2013.01); *G02C 5/146* (2013.01); *G02C 5/22* (2013.01); *G06F 1/163* (2013.01); *G06F 1/1698* (2013.01); *H01Q 9/30* (2013.01); *H04B 1/0064* (2013.01); *H04B 1/385* (2013.01); *G02B 2027/0178* (2013.01)

(58) Field of Classification Search
CPC .......... G02C 11/10; G02C 5/146; G02C 5/22; B29D 12/02; G02B 27/017; G02B 2027/0178; G06F 1/163; G06F 1/1698; G06F 1/1677; G06F 1/1681; G06F 1/1683; H01Q 9/30; H01Q 1/22; H01Q 1/273; H01Q 21/28; H04B 1/0064; H04B 1/385
USPC ......................................................... 351/158
See application file for complete search history.

(56) References Cited

U.S. PATENT DOCUMENTS

| | | |
|---|---|---|
| 7,213,917 B2 | 5/2007 | Jannard et al. |
| 7,331,666 B2 | 2/2008 | Swab et al. |

(Continued)

*Primary Examiner* — William R Alexander
(74) *Attorney, Agent, or Firm* — BakerHostetler

(57) ABSTRACT

Apparatuses, methods, and systems for a hinge feed antenna of eyewear, are disclosed. One apparatus includes a front frame, a temple arm, and a hinge rotatably connecting the front frame and the temple arm. For an embodiment, the temple arm includes a circuit assembly including at least a radio. For an embodiment, the front frame includes one or more antennas traces, wherein the hinge conductively connects the circuit assembly to the one or more antenna traces. The apparatus further includes an antenna tuner located between the circuit assembly and the hinge, wherein a rotation position of the temple arm is sensed, wherein the rotation position is dependent on an orientation of the front frame relative to the temple arm; and wherein the antenna tuner includes an impedance tuner for adaptively adjusting an input impedance of the impedance tuner based on the sensed rotation position of temple arm.

16 Claims, 5 Drawing Sheets

(51) Int. Cl.
    *H04B 1/00*         (2006.01)
    *H04B 1/3827*     (2015.01)

(56) References Cited

U.S. PATENT DOCUMENTS

| | | |
|---|---|---|
| 2012/0155064 A1 | 6/2012 | Waters |
| 2013/0010256 A1 | 1/2013 | Haddock et al. |
| 2016/0204839 A1 | 7/2016 | Liu et al. |
| 2017/0031181 A1 | 2/2017 | Blum et al. |
| 2018/0212314 A1* | 7/2018 | Rautio ............... G02C 5/22 |
| 2019/0033622 A1 | 1/2019 | Olgun et al. |
| 2019/0041666 A1 | 2/2019 | Abele et al. |
| 2019/0196228 A1 | 6/2019 | Moore et al. |
| 2019/0237856 A1 | 8/2019 | Rautio |
| 2020/0195287 A1* | 6/2020 | Olgun ............... H04B 1/18 |
| 2020/0379257 A1 | 12/2020 | Lee et al. |
| 2021/0184713 A1* | 6/2021 | Olgun ............... H04B 1/0343 |
| 2022/0011603 A1* | 1/2022 | Howell ............... G02C 5/001 |
| 2022/0019083 A1* | 1/2022 | Woodman ........... H04N 23/54 |
| 2023/0031234 A1* | 2/2023 | Olgun ............... H04B 5/0075 |
| 2023/0039467 A1* | 2/2023 | Olgun ............... H04B 1/0343 |

\* cited by examiner

HINGE FEED ANTENNA OF EYEWEAR

RELATED APPLICATIONS

This patent application is a continuation of U.S. patent application Ser. No. 16/684,505, filed Nov. 14, 2019, which is herein incorporated by reference.

FIELD OF THE DESCRIBED EMBODIMENTS

The described embodiments relate generally to electronic eyewear. More particularly, the described embodiments relate to systems, methods, and apparatuses for a hinge feed antenna of electronic eyewear.

BACKGROUND

Eyeglasses generally include a temple arm and front frame. The mechanical connection between these two parts is hinge, which allow temple to rotate to around a 90 degrees angle with respect to the frame. Typically, the hinges are resilient and can tolerate more than a thousand times of bending force.

It is desirable to have methods apparatuses, and systems for a hinge feed antenna of electronic eyewear.

SUMMARY

An embodiment includes an apparatus. The apparatus includes a front frame, a temple arm, and a hinge rotatably connecting the front frame and the temple arm. For an embodiment, the temple arm includes a circuit assembly including at least a radio that supports wireless communication. For an embodiment, the front frame includes one or more antennas traces, wherein the hinge conductively connects the circuit assembly to the one or more antenna traces. The apparatus further includes an antenna tuner located between the circuit assembly and the hinge, wherein a rotation position of the temple arm is sensed, wherein the rotation position is dependent on an orientation of the front frame relative to the temple arm; and wherein the antenna tuner includes an impedance tuner for adaptively adjusting an input impedance of the impedance tuner based on the sensed rotation position of temple arm.

Another embodiment includes a method. The method includes forming one or more antennas by one or more conductive traces of a front frame of an eyewear in combination with a hinge of the eyewear, wherein the hinge is electrically conductive, and wherein the hinge rotatably connects the front frame and a temple arm, receiving or transmitting wireless communication through the one or more antennas, and generating, or receiving the wireless communication, by a circuitry assembly located in the temple arm that includes a radio that supports the wireless communication, wherein the radio is connected to the one or more antennas through the hinge.

Other aspects and advantages of the described embodiments will become apparent from the following detailed description, taken in conjunction with the accompanying drawings, illustrating by way of example the principles of the described embodiments.

DETAILED DESCRIPTION

The embodiments described include methods, apparatuses, and systems for a hinge feed antenna of electronic eyewear. For an embodiment, the eyewear includes a conductive hinge that electrically connects electronic circuitry located within a temple arm of the eyewear with an antenna element located within a front frame of the eyewear. The conductive hinge in combination with the antenna element form an antenna which can be used by the electronic circuitry communicate wirelessly with an external computing device.

Figure 1:
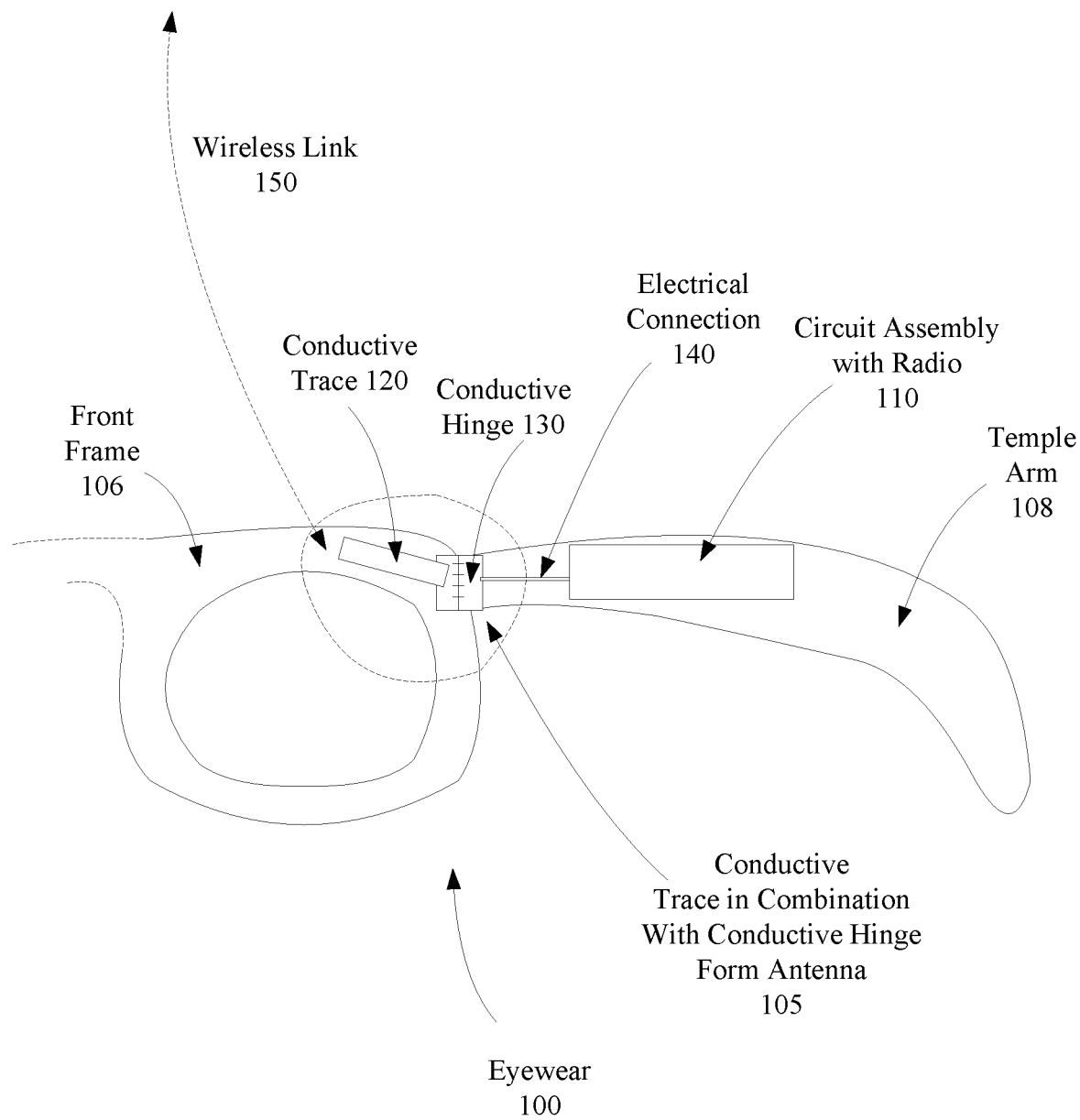
FIG. 1 shows eyewear that includes an antenna formed by a conductive trace and a conductive hinge of the eyewear, according to an embodiment.

FIG. 1 shows eyewear 100 that includes an antenna 105 formed by a conductive trace 120 and a conductive hinge 130 of the eyewear 100, according to an embodiment. The eyewear 100 includes a front frame 106 and a temple arm 108, wherein the front frame 106 and the temple arm 108 are rotatably connected by the conductive hinge 130. For an embodiment, the temple arm 108 includes a circuit assembly 110 that includes at least a radio. An electrical connection 140 connects the circuit assembly 110 to the conductive hinge 130. As previously stated, the conductive hinge 130 in combination with a conductive trace 120 forms the antenna 105. The antenna 105 in conjunction with the radio operate to form a wireless link 150 for supporting wireless communication, which allows the radio of the circuit assembly to communicate with an external radio, thereby allowing the circuit assembly 110 to communicate with an external computing device.

Generally, eyewear such as eyeglasses include the temple arm 108 and the front frame 106. Further, the hinge (such as, hinge 130) provides a mechanical connection between the temple arm 108 and the front frame 106, which allows the temple arm 108 to rotate around a 90 angle with the frame.

Unlike conventional eyeglasses, electronic eyeglasses such as AR (augmented reality) glasses may include sophisticated electronics. The physical size of the electronics may operate to limit the volume of the size of mechanical parts of the eyeglasses. A key industrial design differentiator of eye glasses is the stylish front frame with delicate size. Therefore, it can be desirable to place a PCB (printed circuit board) with ICs (integrated circuits) inside the temple's enclosures behind hinge to support the sophisticated electronics.

Further, AR glasses usually include WiFi or cellular wireless connectivity which requires at least 2 antennas for high throughput data service. Due to the constraints of volume in the temple's enclosure where the PCB and the ICs (including, for example an RFIC (radio frequency integrated circuit)) are placed, it is almost impossible to additionally place 2 antennas in the temple arm. For this reason, it may be desirable to place at least one antenna in the front frame and use RF cable to connect the antenna to the RFIC at temple arm.

Unfortunately, running coaxial cable or a flex PCB through the hinge is not a desirable way of connecting an RF signal of the RFIC to an antenna feed for electronic glasses. An RF coaxial cable is lossy, and most importantly, passing an RF coaxial cable through the hinge increases the hinge size in order to meet reliability/bending requirements, which usually in conflict with industrial design goals.

For at least some embodiments, the size and shape of the conductive hinge 130 is selected based at least in part on the carrier frequency(s) of communication signals passing through the wireless link 150. For at least some embodiments, the size and shape of the conductive trace 120 is selected based at least in part on the carrier frequency(s) of communication signals passing through the wireless link 150. As described, the antenna 150 is formed by the combination of the conductive trace 120 and the conductive hinge 130. Accordingly, for an embodiment, the size and shape of combination of the conductive trace 120 and the conductive hinge 130 are selected based at least in part on the carrier frequency of electromagnetic signals communicated through the antenna 150.

For at least some embodiments, the conductive hinge 130 is formed from a metallic material that electrically and mechanically contacts the conductive trace 120 so that the two parts work in conjunction as a radiating antenna. For an embodiment, the conductive trace 120 includes a metallic trace. For an embodiment, LDS (laser direct structure) technology is used to form the metal trace in, for example, an inner surface of front frame 106 near the hinge 130.

For an embodiment, the temple arm 108 includes the PCB that includes the RFIC. For an embodiment, an inner surface of the temple arm 108 includes the electrical connection 140 which is implemented with conductive feed traces. For an embodiment, LDS (laser direct structure) technology is used to form the conductive feed traces. It is to be understood that LDS is one example of a method for forming the conductive traces, and the other methods of forming the conductive traces may be used.

For an embodiment, the conductive trace 120 forms a main radiator of the antenna 105. For an embodiment, LDS technology is used to form the conductive trace 120 on an inner surface of the front frame 106. It is to be understood that LDS is one example of a method for forming the conductive traces, and the other methods of forming the conductive traces may be used.

For at least some embodiments, the conductive hinge 130 includes a minimum of two frames of reference. A first frame of reference may include a static frame of reference (the front frame 106) and a second frame of reference (the temple arm 108) that moves relative to the static frame of reference (the front frame). Both the temple arm 108 and the front frame 106 include conductive elements (conductive hinge 130, conductive trace 120) fixed in their frames of reference that together form the antenna 105. As will be described, a number of discrete elements may be added to either frame of reference (front frame 106 or temple arm 108) for various different reasons. Structurally, additional elements can be included to provide access for other cable routing, or to provide for more complex motion than simple rotation, or for cosmetic purposes. However, a conductive path is maintained between the two frames of reference.

For an embodiment, the conductive hinge 130 is affixed to the front frame 106 and the temple arm 108 using a structural hinge pin on one side and a plastic barrel on the other, in which the plastic is conductive and formed using LDS technology. For another embodiment, the conductive hinge 130 is affixed to the front frame 106 and the temple arm 108 using a plastic hinge on both sides with LDS antenna surfaces that contact the conductive hinge 130. For another embodiment, the conductive hinge 130 is affixed to the front frame 106 and the temple arm 108 using a metallic hinge assembly that is fastened to the eyewear 100 or embedded during an injection molding process.

For at least some embodiments, a conductive adhesive applied between the elements (that is, between the conductive hinge and the conductive trace 120 and/or the electrical connection 140) to ensure conductivity over time as parts of the conductive hinge 140 wear.

For at least some embodiments, the conductive hinge 130 includes a sliding or rolling contact inside one portion that maintains contact to the other.

Figure 2:
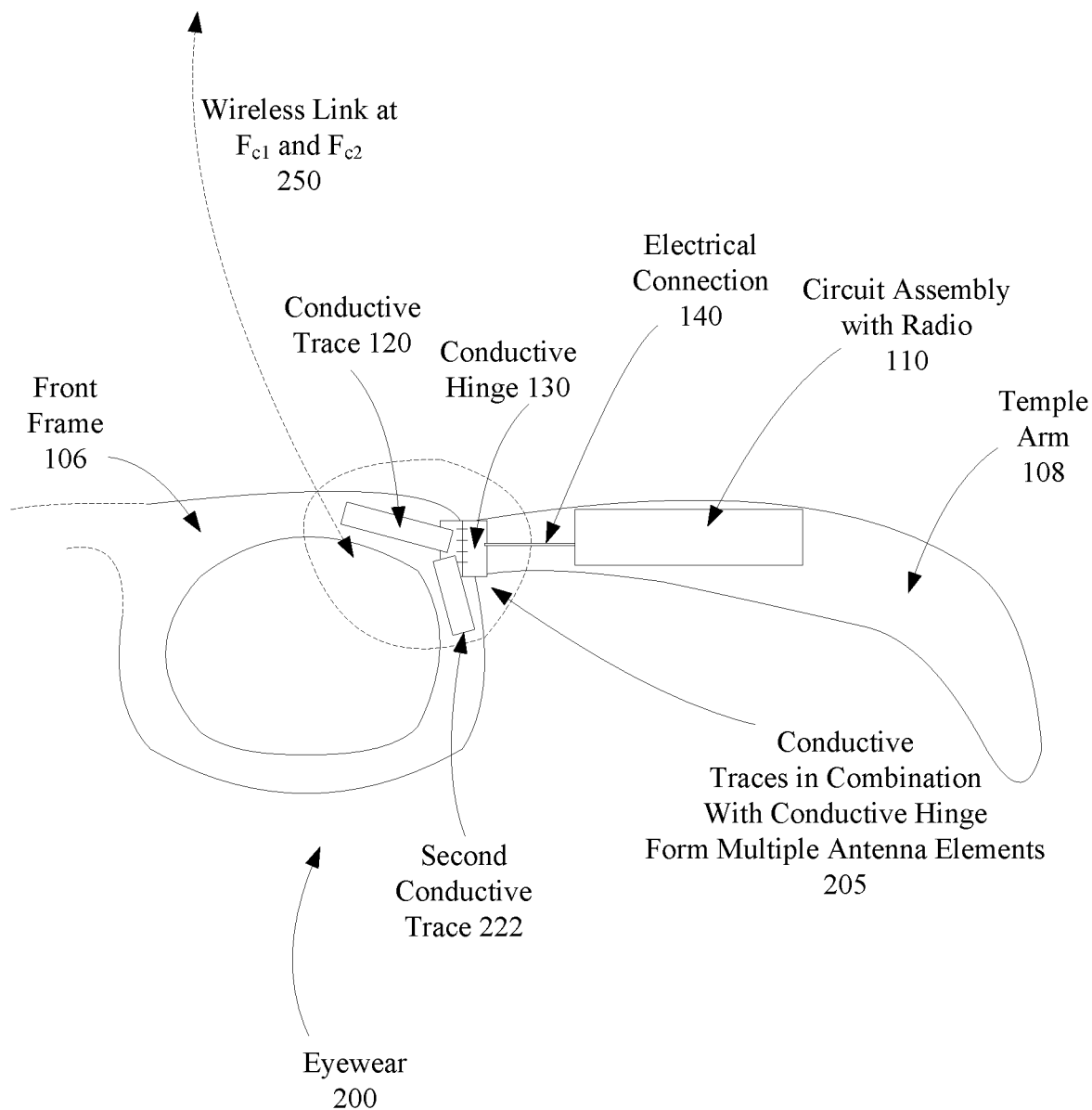
FIG. 2 shows eyewear that includes an antenna formed by conductive traces and a conductive hinge of the eyewear, according to an embodiment.

FIG. 2 shows eyewear that includes an antenna formed by conductive traces and a conductive hinge of the eyewear, according to an embodiment. Specifically, FIG. 2 further includes a second conductive trace 222. Here, the combination of the conductive trace 120, the second conductive trace 222, and the conductive hinge 130 form the antenna 205 of eyewear 200.

For at least some embodiments, dimensions of at least one of the conductive trace 120 or the second conductive trace 222 is selected based on a carrier frequency $F_{c1}$ of wireless signals propagating through the wireless link 250. For at least some embodiments, dimensions of the other of the conductive trace 120 or the second conductive trace 222 is selected based on another carrier frequency $F_{c2}$ of wireless signals propagating through the wireless link 250. By selectively forming the dimensions and shapes of the conductive traces 120, 222, various (multiple) carrier frequencies or frequency channels of wireless communication can be supported.

For an embodiment, dimensions of conductive trace 120, the dimensions of the second conductive trace 222, and the dimensions of the conductive hinge 130 are selected for a single carrier frequency of wireless communication through the link 250. For example, multiple antenna elements may be formed by the combination of the conductive trace 120, the second conductive trace 222, and the conductive hinge 130, and the multiple antenna elements can support MIMO (multiple-input, multiple-output) wireless communication over a single frequency channel.

The dimensions of the conductive trace 120, the dimensions and shapes of the second conductive trace 222, and the dimensions and shapes of the conductive hinge 130 can be determined through experimentation or simulation to ensure that the antenna 205 supports reception or transmission of electromagnetic waves of the desired frequencies.

For at least some embodiments, the conductive (metal) hinge 130 bridges the two parts of traces (that is, the conductive trace 120 and the second conductive trace 222). As previously described, the conductive trace 120 and the second conductive trace 222 function together to form the antenna 205.

For an embodiment, the electrical contact between the PCB of the circuit assembly 110 and a conductive trace of the electrical connection 140 includes a spring contact. For an embodiment, the spring facilitates an electrical connection between an RFIC of the circuit assembly to the antenna 205.

Figure 3:
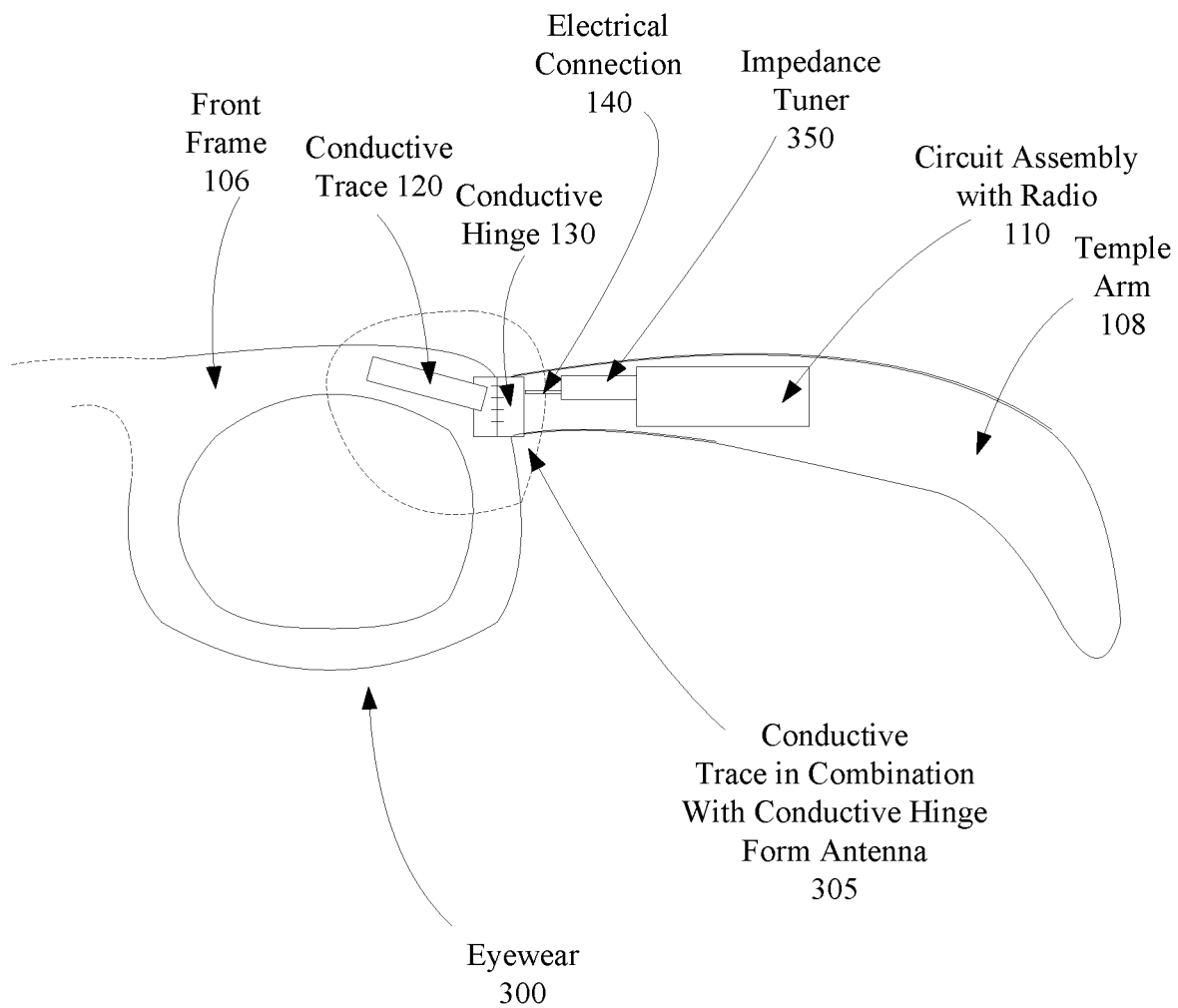
FIG. 3 shows eyewear that includes an antenna formed by a conductive trace, a conductive hinge, and an impedance tuner of the eyewear, according to an embodiment.

FIG. 3 shows eyewear 300 that includes an antenna 305 formed by a conductive trace 120, a conductive hinge 130, and an impedance tuner 350 of the eyewear, according to an embodiment. For at least some embodiments, the conductive hinge 130 provides comfort for users of the eyewear 300 with different head sizes by affording the temples a greater range of movement. That is, for at least some embodiments, the conductive hinge 130 does not limit the user to a 90 degrees angle. That is, the conductive hinge 130 is adapted to be adjusted to angles that vary both less than and/or greater than 90 degrees.

For at least some embodiments, rotation by the conductive hinge 130 of the angle between the front frame 106 and the temple arm 108 causes an impedance that the circuit assembly 110 drives through the electrical connection 140 to change with the rotation. Accordingly, an impedance mismatch will occur between the circuit assembly 110 and the conductive hinge 130 as the temple arm 108 is rotated by the conductive hinge 130 relative to the front frame 106. The impedance mismatch causes less RF energy to be delivered to the antenna 305 formed by the conductive traces 120, 222 and the conductive hinge 130.

At least some embodiments include inserting an impedance tuner 350 between the conductive antenna 130 and the circuit assembly 110 to mitigate the impedance mismatch and the energy loss caused by rotation of the conductive hinge 130. That is, for at least some embodiments, the impedance tuner 350 includes a circuit in which the input impedance of the impedance tuner 350 is adaptively adjusted. For an embodiment, the input impedance of the impedance tuner 350 is adaptively adjusted based on the sensed rotation of the angle between the front frame 106 and the temple arm 108. The resulting adjustment to the input impedance of the impedance tuner 350 is that the circuit assembly 110 drives an input impedance that is more uniform during rotation of the conductive hinge 130 than if the impedance tuner 350 was not included between the conductive hinge 130 and the circuit assembly 110. That is, the impedance tuner mitigates the effects of impedance detuning of the conductive hinge 130 due to different temple arm positions.

For an embodiment, the sensing of the rotation includes sensing discrete angles of the rotation. For example, for an embodiment, the sensing includes "open" and "closed". That is, the sensing determines that the temple arm 108 is approximately 90 degrees (open) relative to the front frame, or the sensing determines that the temple arm 108 is approximately 0 degrees (closed) relative to the front frame 106. Therefore, the sensing is binary and only includes two sensed positions of the temple arm 108 relative to the front frame 106. The sensed position in then used to adjust the impedance of the impedance tuner to mitigate variation of the input impedance faced by the circuit assembly during rotations of the temple arm 108 relative to the front frame 106.

For at least some embodiments, more than two discrete angles of rotation can be sensed. That is, there may be N discrete sensed angles of the rotation. Each of the N discrete sensed angles are fed back to the impedance tuner 350 to accordingly adjust the input impedance faced by the circuit assembly during rotations of the temple arm 108 relative to the front frame 106.

At least some embodiments include a continuous analog sensing of the rotations of the temple arm 108 relative to the front frame 106. Again, the sensed angle is fed back to the impedance tuner 350 to adjust the input impedance.

Figure 4:
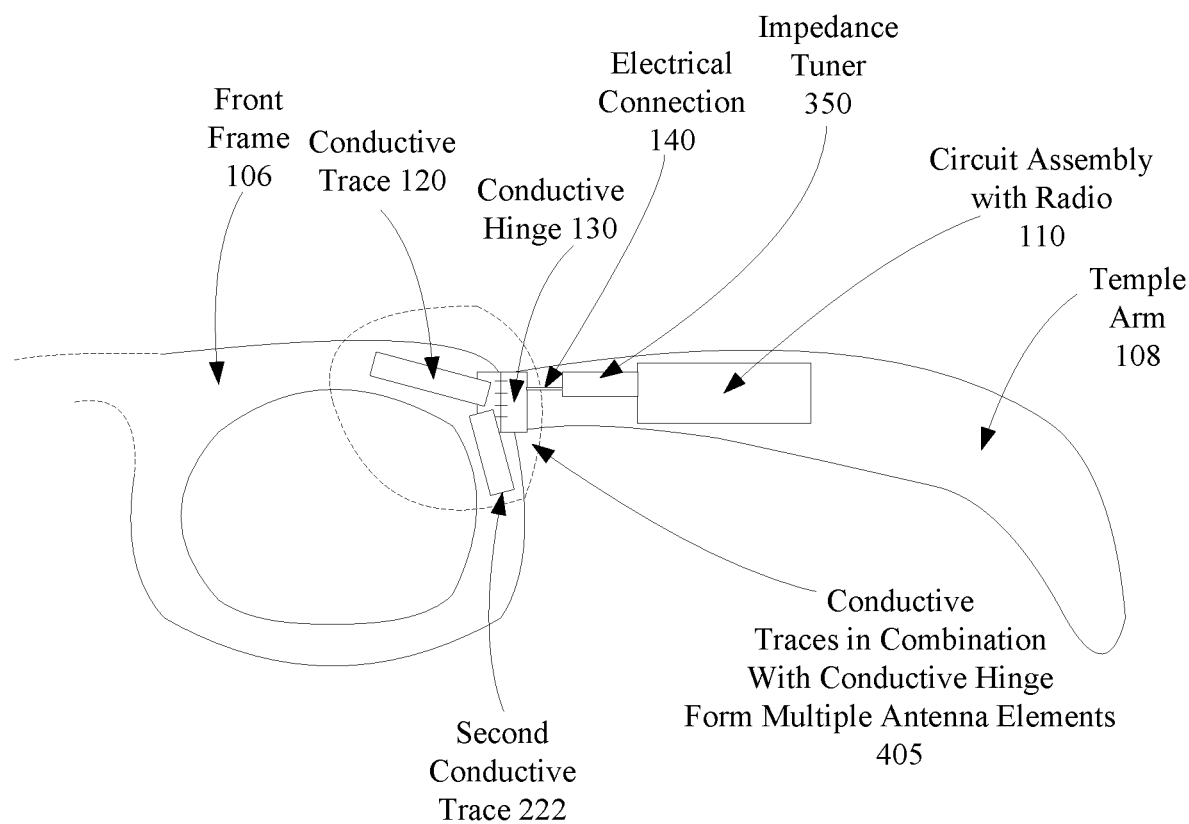
FIG. 4 shows eyewear that includes an antenna formed by conductive traces, a conductive hinge, and an impedance tuner of the eyewear, according to an embodiment.

FIG. 4 shows eyewear that includes an antenna 405 formed by conductive traces, a conductive hinge, and an impedance tuner of the eyewear, according to an embodiment. This embodiment shows the impedance tuner 350 adapted to mitigate the effects of the changing impedance of the conductive hinge 130 when forming an antenna in conjunction with the conductive trace 120 and the second conductive trace 222.

Figure 5:
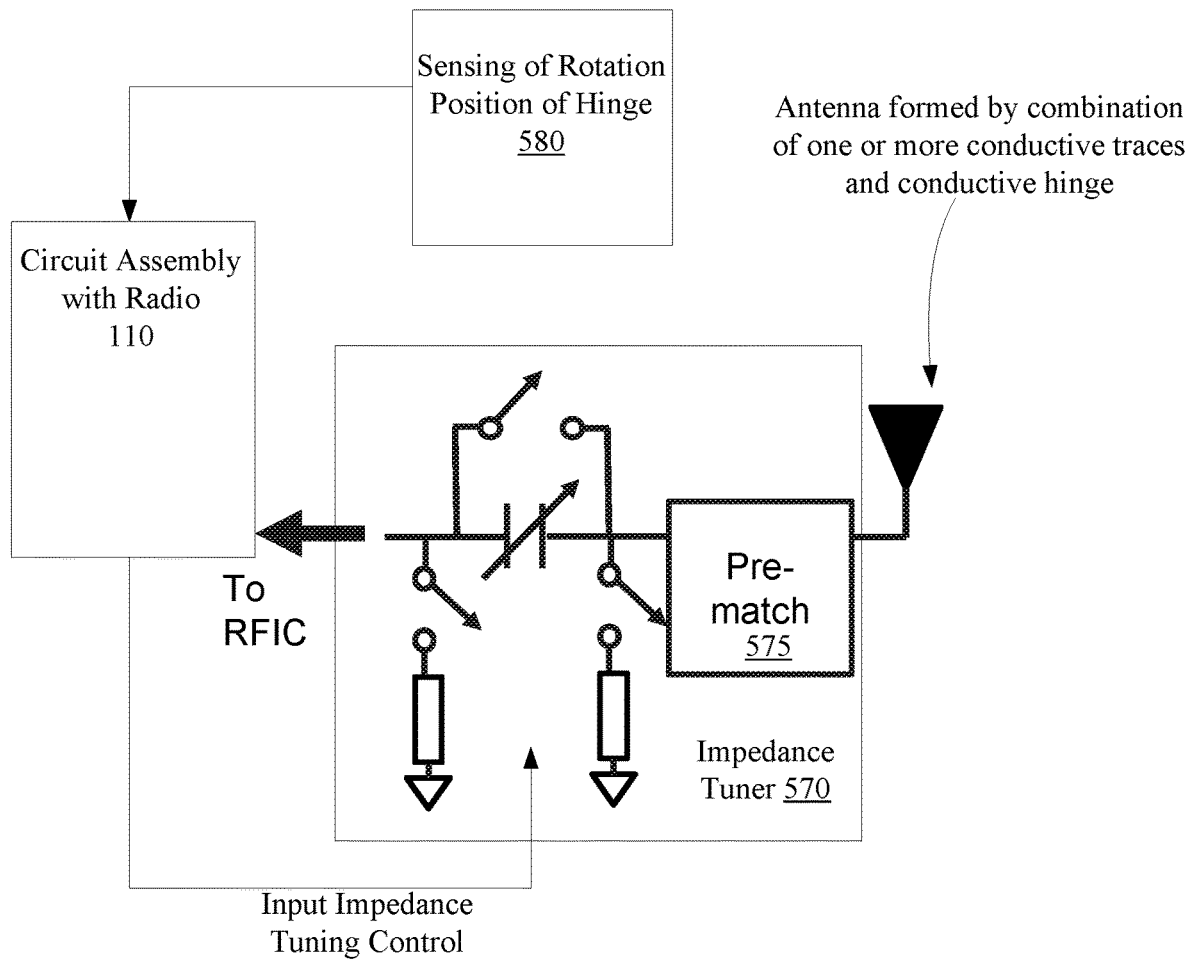
FIG. 5 shows control of an impendence tuner of eyewear, according to an embodiment.

FIG. 5 shows control of an impendence tuner 570 of eyewear, according to an embodiment. As previously described, a rotation of the temple arm relative to the front frame is sensed (580). The sensed rotation is fed back to an impedance tuner 570 for controlling an input impedance faced by the circuit assembly 110.

For an embodiment, the impedance tuner 570 includes pre-match circuitry 575 that initially matches the input impedance with the circuit assembly 110 for a given rotation position. As the temple arm moves relative to the front frame away from the given rotation position, additional circuitry of the impedance tuner 570 is adjusted to mitigate variation of the input impedance of the impedance tuner 570.

As shown, the additional circuitry of the impedance tuner 570 can include switches that switch in or out circuit elements, and/or an adjustable reactance. The switching and adjusting varies the input impedance to mitigate variations in the input impedance of the impedance tuner 570.

For at least some embodiments, the hinge element itself includes of a minimum of two frames of reference. A first reference may be a static frame of reference (the front frame) and which is moving relative to it (the arm). The two frames of reference include conductive elements fixed in their frames of reference that together form an antenna. A number of discrete elements may be added to either frame of reference for various reasons: structural, or to provide access for other cable routing, or to provide for more complex motion than simple rotation, or for cosmetic purposes. In any of these cases, a conductive path needs to be maintained between the two frames of reference.

Various configurations of the conductive hinge are possible, and methods of attaching the hinge to the front frame and the temple arm. For an embodiment, the hinge includes a structural hinge pin on one side and a plastic barrel on the other, in which the plastic has been made conductive using LDS (laser direct structure) technology. For an embodiment, the hinge includes a metal hinge assembly that could be made to be fastened to the rest of the device (front frame of temple arm) or embedded during an injection molding process. For at least some embodiments, a conductive grease is applied between the elements (movable elements of the hinge) to ensure conductivity over time as parts wear. For an embodiment, the hinge includes a sliding or rolling contact inside one portion that maintains contact to the other. Further, at least some embodiments include a combination of above.

Given that glasses hinges tend to be either fully opened or fully closed, there are a few possible implementations for sensing or detecting the position of the temple arm relative to the front frame. The sensors for detecting the hinge orientation do not need to be integral to the hinge. For example, the proximity of the end of the temple arm opposite the hinge could be sensed when it is near the front frame when the hinge is fully closed.

For at least some embodiments, the antenna is tuned to discrete states, such as fully open (on head), fully open (off head), fully closed, fully closed inside case, etc. In this case, a number of sensors can be used to detect open versus closed and a proximity to other objects. Possible sensor includes, but are not limited to a limit switch, optical detectors, hall effect or reed switches, and/or capacitive sensors.

At least some embodiments include detecting a location of the eyewear, or detecting that the eyewear is either on of off the user's head. Possible sensor includes, but are not limited to a capacitive sensor (to sense proximity of the user), a motion sensor/accelerometer (thereby sensing if on the user's head or off the head a in static motion), electrical contact with case charger (thereby indicating the eyewear is within a case). If the eyewear is sensed near a user's head, the assumption can be made that the temple arm is extended relative to the front frame. If the eyewear is sensed to be in electrical contact with a charger, the assumption can be made that the temple arm is closed relative to the front frame.

At least some embodiments include analog sensing of the relative position of the front frame with the temple, which indicates the rotation of the hinge. Possible analog sensors include, but are not limited to a hall effect sensor, a flex or strain sensor on flexible element, an optical sensor, a rotary encoder (magnetic or optical), physical rotary potentiometer, and/or a number of limit switches and interpolation between the limit switches. These sensors and detector operate to continuously (continuously from a closed position of the temple arm relative to the front frame to an open position of the temple are relative to the front frame) detect or sense the temple are position relative to the front frame.

Although specific embodiments have been described and illustrated, the embodiments are not to be limited to the specific forms or arrangements of parts so described and illustrated. The described embodiments are to only be limited by the claims.

What is claimed:

1. An apparatus, comprising:
    a front frame;
    a temple arm;
    a hinge rotatably connecting the front frame and the temple arm;
    the temple arm comprising a circuit assembly including at least a radio that supports wireless communication;
    the front frame comprising one or more antennas traces, wherein the hinge conductively connects the circuit assembly to the one or more antenna traces; and
    an antenna tuner located between the circuit assembly and the hinge;
    wherein a rotation position of the temple arm is sensed, wherein the rotation position is dependent on an orientation of the front frame relative to the temple arm; and
    wherein the antenna tuner includes an impedance tuner to adaptively adjust an input impedance of the impedance tuner based on the sensed rotation position of temple arm.

2. The apparatus of claim 1, wherein the hinge in combination with the one or more antenna traces form one or more antennas to support the wireless communication.

3. The apparatus of claim 1, wherein the front frame comprises a plurality of antenna traces, wherein the hinge and the plurality of antenna traces together forms a plurality of antennas.

4. The apparatus of claim 3, wherein dimensions of a first antenna trace of the plurality of antenna traces are selected to support wireless communication having a first carrier frequency, and dimensions of a second antenna trace of the plurality of antenna traces are selected to support wireless communication having a second carrier frequency.

5. The apparatus of claim 1, wherein the rotation position of the temple arm is discretely sensed and the input impendence of the impedance tuner is adjusted based on the discretely sensed rotation position of the temple arm.

6. The apparatus of claim 5, wherein the rotation position of the hinge is continuously sensed and the input impendence of the impedance tuner is adjusted based on a continuously sensed rotation position of the temple arm.

7. The apparatus of claim 1, wherein one or more antenna traces include conductive metal traces.

8. The apparatus of claim 1, wherein the front frame comprises a plurality of antennas and supports MIMO (Multiple-Input, Multiple-Output) wireless communication.

9. A method, comprising:
    forming one or more antennas by one or more conductive traces of a front frame of an eyewear in combination with a hinge of the eyewear, wherein the hinge is electrically conductive, wherein the hinge rotatably connects the front frame and a temple arm, and wherein an antenna tuner is located between a circuit assembly and the hinge;
    receiving or transmitting wireless communication through the one or more antennas;
    sensing a rotation position of the temple arm, wherein the rotation position is dependent on an orientation of the front frame relative to the temple arm, wherein the antenna tuner includes an impedance tuner to adaptively adjust an input impedance of the impedance tuner based on the sensed rotation position of the temple arm.

10. The method of claim 9, further comprising generating, or receiving the wireless communication, by the circuit assembly, wherein the circuit assembly is located in the temple arm that includes a radio that supports the wireless communication, wherein the radio is connected to the one or more antennas through the hinge.

11. The method of claim 9, wherein the front frame comprises a plurality of antenna traces, wherein the hinge and the plurality of antenna traces together forms a plurality of antennas.

12. The method of claim 11, wherein dimensions of a first antenna trace of the plurality of antenna traces are selected to support wireless communication having a first carrier frequency, and other dimensions of a second antenna trace of the plurality of antenna traces are selected to support wireless communication having a second carrier frequency.

13. The method of claim 9, wherein dimensions and a shape of the hinge are selected based at least in part on a carrier frequency of the wireless communication.

14. The method of claim 9, wherein the rotation position of the hinge is discretely sensed and the input impendence of the impedance tuner is adjusted based on the discretely sensed rotation position of the temple arm.

15. The method of claim 14, wherein the rotation position of the temple arm is continuously sensed and the input impendence of the impedance tuner is adjusted based on the continuously sensed rotation position of the temple arm.

16. The method of claim 9, wherein the front frame comprises a plurality of antennas and supports MIMO (Multiple-Input, Multiple-Output) wireless communication.

* * * * *